United States Patent
Kato et al.

(10) Patent No.: US 9,559,352 B2
(45) Date of Patent: Jan. 31, 2017

(54) ACTIVE MATERIAL, ELECTRODE USING SAME, AND LITHIUM ION SECONDARY BATTERY

(71) Applicant: TDK CORPORATION, Tokyo (JP)

(72) Inventors: Tomohiko Kato, Tokyo (JP); Atsushi Sano, Tokyo (JP); Masaki Sobu, Tokyo (JP); Akinobu Nojima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 131 days.

(21) Appl. No.: 14/388,988

(22) PCT Filed: Mar. 27, 2013

(86) PCT No.: PCT/JP2013/058962
§ 371 (c)(1),
(2) Date: Sep. 29, 2014

(87) PCT Pub. No.: WO2013/146864
PCT Pub. Date: Oct. 3, 2013

(65) Prior Publication Data
US 2015/0111105 A1    Apr. 23, 2015

(30) Foreign Application Priority Data

Mar. 27, 2012 (JP) .................................. 2012-070937

(51) Int. Cl.
*H01M 4/131* (2010.01)
*H01M 4/36* (2006.01)
(Continued)

(52) U.S. Cl.
CPC ............. *H01M 4/131* (2013.01); *H01M 4/364* (2013.01); *H01M 4/525* (2013.01);
(Continued)

(58) Field of Classification Search
None
See application file for complete search history.

(56) References Cited

U.S. PATENT DOCUMENTS

2004/0262571 A1* 12/2004 Barker .................... C01B 25/37
                                                    252/182.1
2006/0093916 A1*  5/2006 Howard .................... A61N 1/08
                                                    429/231.95

(Continued)

FOREIGN PATENT DOCUMENTS

JP    A-2008-235151    10/2008
WO    WO 2011/00838  *  9/2011 ............ H01M 4/525

OTHER PUBLICATIONS

Gaubicher et al., "Li/β-VOPO4: A New 4 V System for Lithium Batteries," J. Electrochem. Soc. 146 (12) 4375-4379 (1999), month of public availability unknown.*
Kerr et al., "Highly Reversible Li Insertion at 4 V in ε-VOPO4/αLiVOPO4 Cathodes," Electrochemical and Solid-State Letters, 3 (10) 460-462 (2000), available electronically Aug. 3, 2000.*

*Primary Examiner* — Ula C Ruddock
*Assistant Examiner* — Amanda Barrow
(74) *Attorney, Agent, or Firm* — Oliff PLC

(57) ABSTRACT

To provide an active material with high capacity, high initial charge-discharge efficiency, and high average discharge voltage. An active material according to the present invention includes a first active material and a second active material, wherein the ratio (δ) of the second active material (B) to the total amount by mole of the first active material (A) and the second active material (B) satisfies 0.4 mol %≤δ≤18 mol % [where δ=(B/(A+B))×100].

19 Claims, 1 Drawing Sheet

(51) Int. Cl.
*H01M 4/525* (2010.01)
*H01M 4/58* (2010.01)
*H01M 10/0525* (2010.01)

(52) U.S. Cl.
CPC ...... *H01M 4/5825* (2013.01); *H01M 10/0525* (2013.01); *Y02E 60/122* (2013.01)

(56) References Cited

U.S. PATENT DOCUMENTS

| | | | | |
|---|---|---|---|---|
| 2008/0280203 | A1* | 11/2008 | Yada | H01M 4/131 |
| | | | | 429/220 |
| 2010/0055567 | A1* | 3/2010 | Nakai | H01M 4/131 |
| | | | | 429/223 |
| 2010/0078591 | A1* | 4/2010 | Sano | H01M 4/366 |
| | | | | 252/182.1 |
| 2010/0159324 | A1* | 6/2010 | Irvin | H01M 4/13 |
| | | | | 429/220 |
| 2010/0303701 | A1* | 12/2010 | Faulkner | C01B 25/45 |
| | | | | 423/305 |
| 2011/0031437 | A1* | 2/2011 | Nagase | H01M 4/505 |
| | | | | 252/182.1 |
| 2012/0213920 | A1* | 8/2012 | Yanagita | H01M 4/0404 |
| | | | | 427/126.6 |
| 2013/0059211 | A1* | 3/2013 | Schaefer | H01M 4/364 |
| | | | | 429/400 |

* cited by examiner

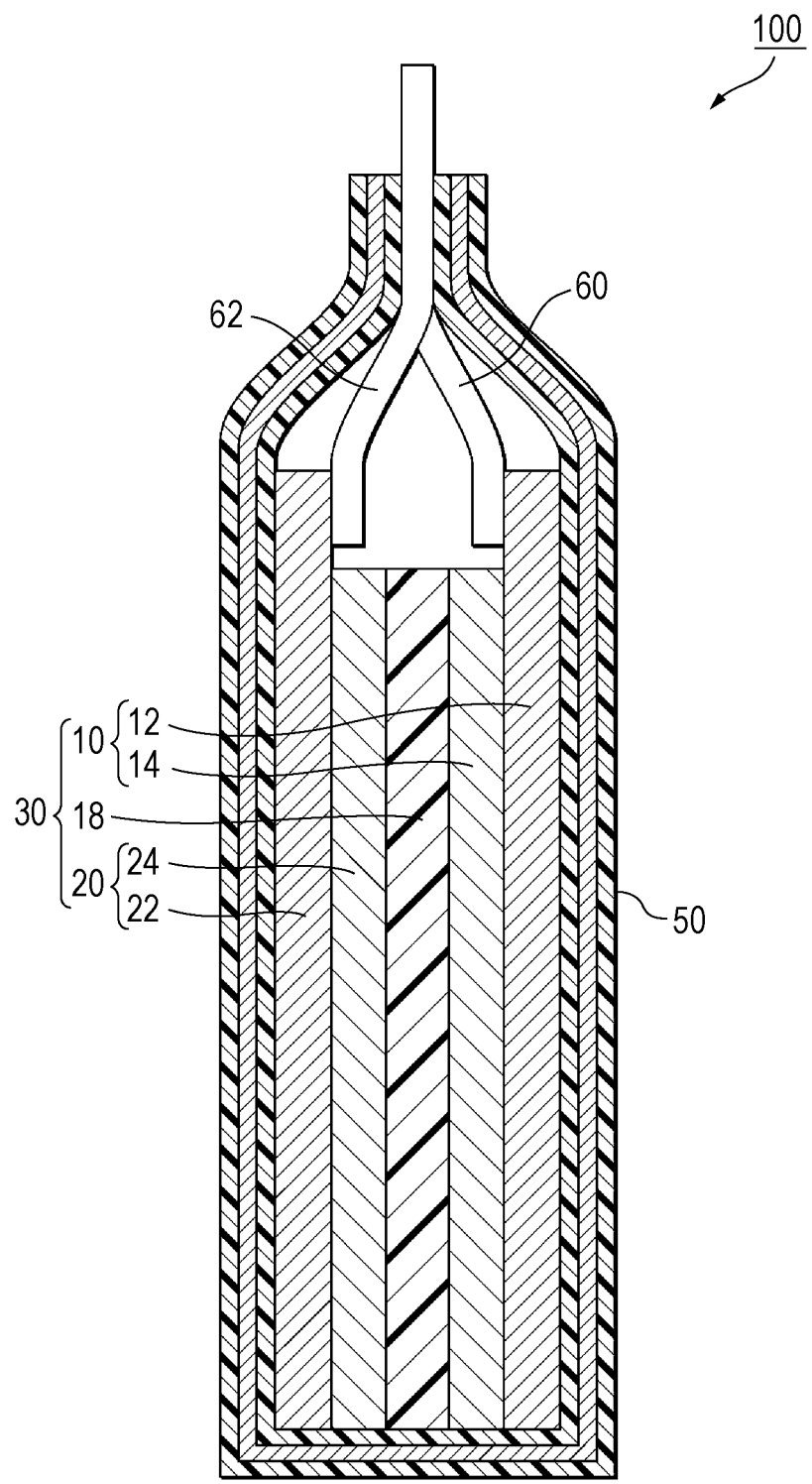

ACTIVE MATERIAL, ELECTRODE USING SAME, AND LITHIUM ION SECONDARY BATTERY

The present invention relates to an active material, an electrode containing the same, and a lithium ion secondary battery.

BACKGROUND

In recent years, the spread of various kinds of electric automobiles has been expected as the solution to the environment and energy issues. The development of the lithium ion secondary battery as an on-vehicle power source such as a power source for driving a motor, which is the key for the practical application of the electric automobiles, has been conducted extensively. For widely spreading the battery as the on-vehicle battery, however, it is necessary to increase the performance of the battery and decrease the price of the battery. Moreover, the mileage per charge of the electric automobile needs to be as long as that of the automobile powered by a gasoline engine. Thus, the battery with higher energy has been anticipated.

For allowing the battery to have higher energy density and higher discharge capacity, it is necessary to increase the quantity of electricity to be stored in a positive electrode and a negative electrode per unit mass. As a positive electrode material (active material for a positive electrode) that can meet the above requirements, a Ni—Co—Mn ternary composite oxide and a so-called solid solution based material having a crystal structure belonging to a space group R-3m and containing lithium in a transition metal site have been examined. In the Ni—Co—Mn ternary composite oxide and the solid solution based material, however, since the irreversible capacity at the initial charge is high, the initial charge-discharge efficiency of the positive electrode active material is low. Therefore, in the design of the battery, the opposite negative electrode needs to be used excessively, resulting in a problem that the battery capacity deteriorates, for example. In view of this, Patent Literature 1 has suggested that the initial charge-discharge efficiency is improved by the inclusion of the lithium-contained metal oxide containing nickel and manganese, and $LiFePO_4$.

PATENT DOCUMENTS

PATENT DOCUMENT 1: JP-A-2008-235151

SUMMARY

In the positive electrode containing the lithium-contained metal oxide containing nickel and manganese, and $LiFePO_4$ according to Patent Literature 1, however, the initial charge-discharge efficiency is improved but the average discharge voltage is low.

The present invention has been made in view of the above problem of the conventional technique. An object of the present invention is to provide a positive electrode active material, an electrode containing the positive electrode active material, and a lithium ion secondary battery, which have high capacity, high initial charge-discharge efficiency, and high average discharge voltage.

An active material according to the present invention for achieving the above object includes at least one kind of first active materials selected from active materials represented by a composition formula (1) or a composition formula (2):

$$Li_wNi_x(M1)_y(M2)_zO_2 \quad (1)$$

[where M1 represents at least one kind selected from Co and Mn; M2 represents at least one kind selected from Al, Fe, Cr, and Mg; $1.0<w<1.1$; $2.0<(x+y+z+w)\leq 2.1$; $0.3<x<0.95$; $0.01<y<0.4$; and $0.001<z<0.2$]

$$Li_aNi_bCo_cMn_r(M3)_sO_2 \quad (2)$$

[where M3 represents at least one kind selected from the group consisting of Al, Si, Zr, Ti, Fe, Mg, Nb, Ba, and V; $2.0\leq(p+q+r+s+t)\leq 2.2$, $1.0<t\leq 1.3$, $0<p\leq 0.3$, $0\leq q\leq 0.3$, $0.3\leq r\leq 0.7$, and $0\leq s\leq 0.1$], and a second active material represented by a composition formula (3), which is different from the first active material:

$$Li_{1-\alpha}VOPO_4 \quad (3)$$

[where $\alpha$ satisfies $0<\alpha\leq 1$], wherein a ratio ($\delta$) of the second active material (B) to the total amount by mole of the first active material (A) and the second active material (B) satisfies $0.4$ mol $\%\leq\delta\leq 18$ mol $\%$. In other words, $\delta$ (unit: mol %) is represented by $\delta=(B/(A+B))\times 100$.

According to the active material of the present invention, a positive electrode active material and a lithium ion secondary battery containing the positive electrode active material, which have high capacity, high initial charge-discharge efficiency, and high average discharge voltage can be provided. The reasons for the above are not necessarily clear but the present inventors consider as follows: the crystal structure of the first active material is partly stabilized by the movement of Li of the first active material to the second active material during mixing or heat treatment of the first active material and the second active material; and moreover, the capacity, the initial charge-discharge efficiency, and the average discharge voltage are increased because the second active material contributes to the charge and discharge.

An electrode of the present invention includes a current collector, and an active material layer containing the aforementioned active material and provided on the current collector. Thus, the electrode with high capacity, high initial charge-discharge efficiency, and high average discharge voltage can be provided.

A lithium ion secondary battery of the present invention includes: the aforementioned electrode; a negative electrode provided opposite to the electrode; a separator provided between the electrodes; and an electrolyte. Thus, the lithium ion secondary battery with high capacity, high initial charge-discharge efficiency, and high average discharge voltage can be provided.

Note that the material such as $Li_wNi_x(M1)_y(M2)_xO_2$ (composition formula (1)), $Li_aNi_bCo_cMn_dO_2$ (composition formula (2)), $Li_{1-\alpha}VOPO_4$ (composition formula (3)) are expressed based on the stoichiometric composition. The material may partly lack oxygen or the transition metal.

According to the present invention, a positive electrode active material, an electrode containing the positive electrode active material, and a lithium ion secondary battery, which have high capacity, high initial charge-discharge efficiency, and high average discharge voltage can be provided.

BRIEF DESCRIPTION OF THE DRAWINGS

FIG. 1 is a schematic sectional view of a lithium ion secondary battery including a positive electrode active material layer containing an active material of this embodiment.

DETAILED DESCRIPTION OF EMBODIMENTS

Description is hereinafter made of an active material and a lithium ion secondary battery according to an embodiment of the present invention. Note that the present invention is not limited to the embodiment below.

An active material according to the present embodiment includes at least one kind of first active materials selected from active materials represented by a composition formula (1) or a composition formula (2):

$$Li_wNi_x(M1)_y(M2)_zO_2 \quad (1)$$

[where M1 represents at least one kind selected from Co and Mn; M2 represents at least one kind selected from Al, Fe, Cr, and Mg; $1.0<w<1.1$; $2.0<(x+y+z+w)\leq 2.1$; $0.3<x<0.95$; $0.01<y<0.4$; and $0.001<z<0.2$]

$$Li_tNi_pCo_qMn_r(M3)_sO_2 \quad (2)$$

[where M3 represents at least one kind selected from the group consisting of Al, Si, Zr, Ti, Fe, Mg, Nb, Ba, and V; $2.0\leq(p+q+r+s+t)\leq 2.2$, $1.0<t\leq 1.3$, $0<p\leq 0.3$, $0\leq q\leq 0.3$, $0.3\leq r\leq 0.7$, and $0\leq s\leq 0.1$], and a second active material represented by a composition formula (3), which is different from the first active material:

$$Li_{1-\alpha}VOPO_4 \quad (3)$$

[where $\alpha$ satisfies $0<\alpha\leq 1$], wherein a ratio ($\delta$) of the second active material (B) to the total amount by mole of the first active material (A) and the second active material (B) satisfies 0.4 mol $\%\leq\delta\leq 18$ mol %.

According to the active material of this embodiment, a positive electrode active material and a lithium ion secondary battery containing the positive electrode active material, which have high capacity, high initial charge-discharge efficiency, and high average discharge voltage can be provided.

(First Active Material)

As the first active material, the material represented by the composition formula (1): $Li_wNi_x(M1)_y(M2)_zO_2$ is given. M1 is at least one kind selected from Co and Mn. M2 is at least one kind selected from Al, Fe, Cr, and Mg. In particular, the material in which w satisfies $1.0<w<1.1$, x+y+z+w satisfies $2.0<(x+y+z+w)\leq 2.1$, x satisfies $0.3<x<0.95$, y satisfies $0.01<y<0.4$, and z satisfies $0.001<z<0.2$ can be used. Thus, the high capacity can be obtained. As another first active material, the material represented by a composition formula (2): $Li_tNi_pCo_qMn_r(M3)_sO_2$ is given. M3 is at least one kind selected from Al, Si, Zr, Ti, Fe, Mg, Nb, Ba, and V. In particular, the material in which p+q+r+s+t satisfies $2.0\leq(p+q+r+s+t)\leq 2.2$, t satisfies $1.0\leq t\leq 1.3$, p satisfies $0<p\leq 0.3$, q satisfies $0\leq q\leq 0.3$, r satisfies $0.3\leq r\leq 0.7$, and s satisfies $0\leq s\leq 0.1$ can be used. Thus, the high capacity can be obtained.

Moreover, the amount of Ni in the composition formula (2), which is represented by p, preferably satisfies $0.04\leq p\leq 0.3$, more preferably $0.08\leq p\leq 0.3$, and the most preferably $0.17\leq p\leq 0.3$.

Moreover, the amount of Mn in the composition formula (2), which is represented by r, preferably satisfies $0.35\leq r\leq 0.6$ and more preferably $0.45\leq r\leq 0.6$.

Moreover, the amount of Co in the composition formula (2), which is represented by q, preferably satisfies $0\leq q\leq 0.28$ and more preferably $0.14\leq q\leq 0.28$.

The first active material may contain the active material represented by any one of the composition formulae (1) and (2). Alternatively, a mixture containing two or more kinds of different compositions may be used.

(Second Active Material)

As a second active material, the material represented by the composition formula (3): $Li_{1-\alpha}VOPO_4$, which is different from the first active material, is given. Note that $\alpha$ satisfies $0<\alpha\leq 1$. In particular, a preferably satisfies $0.1\leq\alpha\leq 1$, more preferably $0.2\leq\alpha\leq 1$, and particularly preferably $0.5\leq\alpha\leq 1$. It is considered that when $\alpha$ is 0.2 or more, the mutual diffusion of Li with the first active material easily occurs.

The crystal state of $Li_{1-\alpha}VOPO_4$ is not particularly limited and the state may be partially amorphous. In particular, $Li_{1-\alpha}VOPO_4$ as the orthorhombic crystal is preferable. By the use of $Li_{1-\alpha}VOPO_4$ as the orthorhombic crystal, the material with particularly high average discharge voltage can be obtained.

A part of the element V of the second active material may be substituted by one or more elements selected from the group consisting of Ti, Ni, Co, Mn, Fe, Zr, Cu, Zn, and Yb.

Then, the ratio ($\delta$) of the second active material (B mol) to the total amount by mole of the first active material (A) and the second active material (B) may be 0.4 mol $\%\leq\delta\leq 18$ mol %. Moreover, $\delta$ preferably satisfies 1 mol $\%\leq\delta\leq 10$ mol % and more preferably 3 mol $\%\leq\delta\leq 10$ mol %. Thus, the material with high capacity, high initial charge-discharge efficiency, and high average discharge voltage can be obtained.

$$\delta=(B/(A+B))\times 100$$

When the ratio ($\delta$) is less than 0.4 mol %, the initial charge-discharge efficiency may be small. When the ratio ($\delta$) is more than 18 mol %, the capacity may be small.

The primary particles of the first active material and the second active material preferably have an average particle diameter of 0.05 µm or more and 10 µm or less. The lithium ion secondary battery containing the active material as above has high capacity. When the active material has the primary particles with an average particle diameter of less than 0.05 µm, it tends to be difficult to handle the powder. When the active material has the primary particles with an average particle diameter of more than 10 µm, the capacity tends to be smaller. More preferably, the average particle diameter is 0.07 µm or more and 3 µm or less. Moreover, it is preferable that the average particle diameter of the primary particles of the second active material is smaller than that of the first active material. The second active material preferably exists near the surface of the first active material. These facilitate the mutual operation such as the movement of Li of the first active material to the second active material during the mixing or the heat treatment of the first active material and the second active material.

A manufacturing method for the first active material is not particularly limited. The manufacturing method for the first active material includes at least a raw material preparing step and a firing step. The first active material can be manufactured by mixing predetermined lithium source and metal source so as to satisfy the molar ratio represented by the composition formula (1) or (2) and by performing pulverizing and mixing, thermal decomposing and mixing, precipitation reaction, hydrolysis decomposition, or the like.

A manufacturing method for the second active material is not particularly limited. The manufacturing method for the second active material includes at least a raw material preparing step and a firing step. In the raw material preparing step, a lithium source, a vanadium source, a phosphorus source, and water are stirred and mixed, thereby preparing a mixture (mixture liquid). A drying step of drying the mixture obtained by the raw material preparing step may be performed before the firing step. A hydrothermal synthesis step may be performed as necessary before the drying step and the firing step.

The mixing ratio of the lithium source, the vanadium source, and the phosphorus source is adjusted so that, for example, the molar ratio of Li, V, and P in the mixture becomes the stoichiometric ratio of $LiVOPO_4$ (1:1:1). Then, Li is electrochemically deintercalated from $LiVOPO_4$ obtained by drying and firing the mixture, thereby manufacturing the second active material.

Alternatively, the mixture may be adjusted by stirring the phosphorus source, the vanadium source, and distilled water. By drying this mixture, a hydrate $VOPO_4 \cdot 2H_2O$ may be manufactured and by further heating this hydrate, $VOPO_4$ may be manufactured. The obtained $VOPO_4$ may be used as the second active material. Moreover, the second active material can be manufactured by mixing and heating $VOPO_4$ and the lithium source. The state of the aforementioned compound of the metal source, the lithium source, the vanadium source, and the phosphorus source is not particularly limited. A known material including an oxide or a salt can be selected in accordance with the process.

A pulverizer or a classifier may be used for providing the powder of the active material with a desired particle diameter. For example, a mortar, a ball mill, a bead mill, a sand mill, a vibration ball mill, a planetary ball mill, a jet mill, a counter jet mill, a circulating air flow jet mill, and a sieve can be used. For the pulverizing, a wet type pulverizing where water or an organic solvent such as hexane is used in combination can be used. A method of classification is not particularly limited and a sieve or an air classifier may be used in either dry or wet method as necessary.

The first active material and the second active material are weighed at a predetermined proportion and mixed as necessary. The method of mixing these is not particularly limited and any apparatus can be used. Specifically, the materials can be mixed in either dry or wet method using a power mixing machine such as a mortar, a V-type blender, an S-type blender, a grinding machine, a ball mill, or a planetary ball mill.

Moreover, in this embodiment, the positive electrode active material obtained by the above mixing method may be fired in an argon atmosphere, an air atmosphere, an oxygen atmosphere, a nitrogen atmosphere, or an atmosphere containing a mixture thereof.

<Lithium Ion Secondary Battery>

Subsequently, brief description is made of an electrode and a lithium ion secondary battery according to this embodiment with reference to FIG. 1.

A lithium ion secondary battery 100 includes mainly a multilayer body 30, a case 50 for housing the multilayer body 30 in a sealed state, and a pair of leads 60 and 62 connected to the multilayer body 30.

In the multilayer body 30, a positive electrode 10 and a negative electrode 20 are disposed to face each other with a separator 18 interposed therebetween. The positive electrode 10 has a positive electrode active material layer 14 provided on a positive electrode current collector 12. The negative electrode 20 has a negative electrode active material layer 24 provided on a negative electrode current collector 22. The positive electrode active material layer 14 is in contact with one side of the separator 18 and the negative electrode active material layer 24 is in contact with the other side thereof. Edge part of the positive electrode current collector 12 and the negative electrode current collector 22 are connected to the leads 60 and 62, respectively. Edge part of the leads 60 and 62 extend out of the case 50.

For the positive electrode current collector 12 of the positive electrode 10, for example, an aluminum foil or the like can be used. The positive electrode active material layer 14 is a layer containing the aforementioned active material particle 1, a binder, and a conductive material that is added as necessary. As the conductive material that is added as necessary, for example, carbon blacks, a carbon material, and a conductive oxide such as ITO are given.

The binder is not particularly limited as long as the binder can bind the aforementioned active material particle and conductive material to the current collector, and may be a known binder. For example, a fluorine resin such as polyvinylidene fluoride (PVDF), polytetrafluoroethylene (PTFE), or vinylidene fluoride-hexafluoropropylene copolymer can be given.

The positive electrode as above can be manufactured by a known method; for example, a slurry obtained by adding an electrode active material containing the aforementioned active material particle 1 or the active material particle 1, the binder, and the conductive material to a solvent according to their kinds is applied to the surface of the positive electrode current collector 12 and then the slurry is dried. In the case of using PVDF, for example, the solvent such as N-methyl-2-pyrrolidone and N,N-dimethylformamide is used.

For the negative electrode current collector 22, a copper foil or the like can be used. For the negative electrode active material layer 24, a layer containing a negative electrode active material, a conductive material, and a binder can be used. The conductive material is not particularly limited and a carbon material, metal powder, or the like can be used. As the binder used for the negative electrode, a fluorine resin such as polyvinylidene fluoride (PVDF), polytetrafluoroethylene (PTFE), or tetrafluoroethylene/hexafluoropropylene copolymer (FEP) can be given.

As the negative electrode active material, for example, particles including a carbon material such as graphite and hard carbon, metal capable of forming a compound with lithium, such as Al, Si, or Sn, an amorphous compound mainly containing an oxide, such as $SiO_2$ or $SnO_2$, lithium titanate ($Li_4Ti_5O_{12}$), or the like are given.

In a manufacturing method for the negative electrode 20, a slurry may be prepared and applied to the current collector in a manner similar to the manufacturing method for the positive electrode 10.

The electrolyte is not particularly limited. For example, in this embodiment, an electrolyte containing lithium salt in an organic solvent can be used. Examples of the lithium salt include $LiPF_6$, $LiClO_4$, and $LiBF_4$. Any of these salts may be used alone or two or more kinds thereof may be used in combination.

Examples of the organic solvent include propylene carbonate, ethylene carbonate, diethyl carbonate, dimethyl carbonate, and methylethylcarbonate. Any of these may be used alone or two or more kinds thereof may be mixed at any proportion and used in combination.

As the separator 18, for example, a single-layer body or a multilayer body including a porous film of polyethylene, polypropylene, or polyolefin, an extended film of a mixture of the above resin, or fiber fibrous nonwovens including at least one component material selected from the group consisting of cellulose, polyester, and polypropylene is applicable.

The case 50 is to have the multilayer body 30 and the electrolyte inside in a sealed state. The case 50 is not particularly limited as long as the leakage of the electrolyte to the outside and the intrusion of moisture and the like from the outside to the inside of the lithium ion secondary battery 100 can be suppressed. For example, a metal laminated film can be used as the case 50.

The leads 60 and 62 are formed of a conductive material such as aluminum.

The active material of this embodiment can be used as an electrode material for an electrochemical device other than the lithium ion secondary battery. Examples of the electrochemical device as above include a secondary battery other than the lithium ion secondary battery, such as a metal lithium secondary battery (including an electrode containing a composite particle of the present invention for a cathode and containing metal lithium for an anode), and an electrochemical capacitor such as a lithium capacitor.

The present invention will be described more specifically based on Examples and Comparative Examples. The present invention is, however, not limited to the examples below.

EXAMPLES

Example 1

In Example 1, a positive electrode was manufactured using as a positive electrode active material, a material obtained by weighing and mixing in a mortar a lithium nickel composite oxide ($Li_{1.01}Ni_{0.8}Co_{0.15}Al_{0.05}O_2$) as the first active material represented by the composition formula (1) and $Li_{0.4}VOPO_4$ as the second active material at a molar ratio of 99:1. $Li_{0.4}VOPO_4$ was obtained by deintercalating lithium from the orthorhombic crystal $LiVOPO_4$.

[Manufacture of Positive Electrode]

A coating for the positive electrode was prepared by mixing the active material of Example 1, a conductive auxiliary agent, and a solvent containing a binder. The coating for the positive electrode was applied on an aluminum foil as the current collector (thickness: 20 μm) by a doctor blade method. After that, the aluminum foil was dried at 100° C. and pressed. Thus, the positive electrode including the positive electrode active material layer and the current collector was obtained. As the conductive auxiliary agent, carbon black (DAB50 manufactured by DENKI KAGAKU KOGYO KABUSHIKI KAISHA) and graphite were used. As the solvent including the binder, N-methyl-2-pyrrolidinone (KF7305 manufactured by KUREHA CORPORATION) with PVDF dissolved therein was used.

[Manufacture of Negative Electrode]

Natural graphite was used, and just the carbon black was used as the conductive auxiliary agent. A coating for the negative electrode was prepared in a manner similar to the coating for the positive electrode. The coating for the negative electrode was applied on a copper foil (thickness: 16 μm) as the current collector by a doctor blade method. After that, the copper foil was dried at 100° C. and pressed. Thus, the negative electrode including the negative electrode active material layer and the current collector was obtained.

[Manufacture of Lithium Ion Secondary Battery]

The manufactured positive electrode and negative electrode and the separator (a microporous film of polyolefin) were cut into a predetermined size. The positive electrode and the negative electrode were provided with a portion where the coating for the electrode was not applied, so that the portion is used for welding an external extraction terminal. The positive electrode, the negative electrode, and the separator were stacked in this order; on this occasion, the positive electrode, the negative electrode, and the separator were fixed by the application of a small amount of hot-melt adhesive (ethylene-methacrylic acid copolymer, EMAA) to avoid the displacement of the positive electrode, the negative electrode, and the separator. An aluminum foil (with a width of 4 mm, a length of 40 mm, and a thickness of 100 μm) and a nickel foil (with a width of 4 mm, a length of 40 mm, and a thickness of 100 μm) were welded through ultrasonic waves as the external extraction terminals to the positive electrode and the negative electrode, respectively. Polypropylene (PP) obtained by grafting maleic anhydride was wound around the external extraction terminal and thermally bonded thereto. This is to improve the sealing property between the external terminal and an exterior body. As the battery exterior body in which the battery element obtained by stacking the positive electrode, the negative electrode, and the separator is sealed, an aluminum laminated material including a PET layer, an Al layer, and a PP layer was used. The PET layer had a thickness of 12 μm, the Al layer had a thickness of 40 μm, and the PP layer had a thickness of 50 μm. PET stands for polyethylene terephthalate and PP stands for polypropylene. In the manufacture of the battery exterior body, the PP layer was disposed on the inside of the exterior body. By putting the battery element in the exterior body, adding an appropriate amount of the electrolyte solution, and sealing the exterior body to vacuum, the lithium ion secondary battery of Example 1 was manufactured. As the electrolyte, the solution obtained by dissolving $LiPF_6$ in a mixture solvent of ethylene carbonate (EC) and dimethyl carbonate (DMC) at a concentration of 1 M (mol/L) was used. The volume ratio between EC and DMC in the mixture solvent was set to EC:DMC==30:70.

[Measurement of Electrical Characteristics]

Next, charging was performed at a constant current of 19 mA/g using the battery cell of Example 1 manufactured as above until the charge cut off voltage became 4.3 V (vs. $Li/Li^+$). Further, the constant-voltage charging was performed at a constant voltage of 4.3 V (vs. $Li/Li^+$) until the current value dropped to 9.5 mA/g. Then, the initial charge capacity Qc was measured.

After a rest for 10 minutes, discharging was performed at a constant current of 19 mA/g until the discharge cut off voltage became 2.8 V (vs. $Li/Li^+$). Then, the inital discharge capacity Qd (unit: mAh/g) of the battery was measured.

The intial charge-discharge efficiency (%) of the battery of Example 1 was obtained from the following formula based on the above initial charge capacity Qc and the initial discharge capacity Qd. The results are shown in Table 1 below.

Initial charge-discharge efficiency (%)=($Qd/Qc$)×100

After the initial charge capacity and the initial discharge capacity were measured, the charging was similarly performed at a constant current of 19 mA/g until the charge cut off voltage became 4.3 V (vs. $Li/Li^+$). Moreover, the constant-voltage charging was performed at a constant voltage of 4.3 V (vs. $Li/Li^+$) until the current value dropped to 9.5 mA/g. After a rest for 10 minutes, discharging was performed at a constant current of 19 mA/g until the discharge cut off voltage became 2.8 V (vs. $Li/Li^+$). The average discharge voltage (unit: V) on this occasion was 3.75 V and the capacity at that time was 187 mAh/g.

Examples 2 to 6 and Comparative Examples 1 and 2

In Examples 2 to 6 and Comparative Examples 1 and 2, the lithium ion secondary batteries were manufactured in a manner similar to Example 1 except that the ratio δ was changed, and the electrical characteristics thereof were evaluated. The results are shown in Table 1.

TABLE 1

| | First active material | Second active material | ratio δ [mol %] | discharge capacity | initial charge-discharge efficiency[%] | average discharge voltage | determination |
|---|---|---|---|---|---|---|---|
| Comparative Example 1 | $Li_{1.01}Ni_{0.8}Co_{0.15}Al_{0.05}O_2$ | None | 0 | 190 | 85 | 3.75 | F |
| Example 6 | $Li_{1.01}Ni_{0.8}Co_{0.15}Al_{0.05}O_2$ | $Li_{0.4}VOPO_4$ | 0.4 | 189 | 90 | 3.75 | A |
| Example 1 | $Li_{1.01}Ni_{0.8}Co_{0.15}Al_{0.05}O_2$ | $Li_{0.4}VOPO_4$ | 1 | 187 | 95 | 3.75 | A |
| Example 2 | $Li_{1.01}Ni_{0.8}Co_{0.15}Al_{0.05}O_2$ | $Li_{0.4}VOPO_4$ | 3 | 186 | 96 | 3.76 | A |
| Example 3 | $Li_{1.01}Ni_{0.8}Co_{0.15}Al_{0.05}O_2$ | $Li_{0.4}VOPO_4$ | 5 | 184 | 98 | 3.76 | A |
| Example 4 | $Li_{1.01}Ni_{0.8}Co_{0.15}Al_{0.05}O_2$ | $Li_{0.4}VOPO_4$ | 10 | 182 | 96 | 3.76 | A |
| Example 5 | $Li_{1.01}Ni_{0.8}Co_{0.15}Al_{0.05}O_2$ | $Li_{0.4}VOPO_4$ | 18 | 180 | 92 | 3.78 | A |
| Comparative Example 2 | $Li_{1.01}Ni_{0.8}Co_{0.15}Al_{0.05}O_2$ | $Li_{0.4}VOPO_4$ | 20 | 173 | 91 | 3.78 | F |

In Table 1, the battery with a capacity of 180 mAh/g or more and an initial charge-discharge efficiency of 90% or more is evaluated as "A" and the battery with a capacity of less than 180 mAh/g or an initial charge-discharge efficiency of less than 90% is evaluated as "F".

Example 7

In Example 7, a positive electrode was manufactured using as a positive electrode active material, a material obtained by weighing and mixing in a mortar a lithium nickel composite oxide ($Li_{1.2}Ni_{0.07}Co_{0.08}Mn_{0.55}O_2$) as the first active material represented by the composition formula (2) and $Li_{0.4}VOPO_4$ as the second active material at a molar ratio of 99.6:0.4. $Li_{0.4}VOPO_4$ was obtained by deintercalating lithium from the orthorhombic crystal $LiVOPO_4$.

[Measurement of Electrical Characteristics]

Next, charging was performed at a constant current of 24 mA/g using the battery cell of Example 7 manufactured in a manner similar to Example 1 until the charge cut off voltage became 3.5 V (vs. Li/Li$^+$). Further, the constant-voltage charging was performed at a constant voltage of 4.6 V (vs. Li/Li$^+$) until the current value dropped to 12 mA/g. Then, the initial charge capacity Qc was measured.

After a rest for 10 minutes, discharging was performed at a constant current of 24 mA/g until the discharge cut off voltage became 2.0 V (vs. Li/Li$^+$). Then, the initial discharge capacity Qd of the battery was measured.

The intial charge-discharge efficiency (%) was obtained based on the above initial charge capacity Qc and initial discharge capacity Qd, in a manner similar to Example 1. The results are shown in Table 2.

After the initial charge capacity and the initial discharge capacity were measured, the charging was similarly performed at a constant current of 24 mA/g until the charge cut off voltage became 4.6 V (vs. Li/Li$^+$). Moreover, the constant-voltage charging was performed at a constant voltage of 4.6 V (vs. Li/Li$^+$) until the current value dropped to 12 mA/g. After a rest for 10 minutes, each of the above cells was discharged at a constant current of 24 mA/g until the discharge cut off voltage became 2.0 V (vs. Li/Li$^+$). The average discharge voltage and the discharge capacity on this occasion are shown in Table 2.

Examples 8 to 12 and Comparative Examples 3 and 4

In Examples 8 to 12 and Comparative Examples 3 and 4, the lithium ion secondary batteries were manufactured in a manner similar to Example 7 except that the ratio δ was changed, and the electrical characteristics thereof were evaluated. The results are shown in Table 2.

TABLE 2

| | First active material | Second active material | ratio δ [mol %] | discharge capacity | initial charge-discharge efficiency[%] | average discharge voltage | determination |
|---|---|---|---|---|---|---|---|
| Comparative Example 3 | $Li_{1.2}Ni_{0.17}Co_{0.08}Mn_{0.55}O_2$ | None | 0 | 240 | 75 | 3.70 | F |
| Example 7 | $Li_{1.2}Ni_{0.17}Co_{0.08}Mn_{0.55}O_2$ | $Li_{0.4}VOPO_4$ | 0.4 | 240 | 83 | 3.70 | A |
| Example 8 | $Li_{1.2}Ni_{0.17}Co_{0.08}Mn_{0.55}O_2$ | $Li_{0.4}VOPO_4$ | 1 | 238 | 88 | 3.71 | A |
| Example 9 | $Li_{1.2}Ni_{0.17}Co_{0.08}Mn_{0.55}O_2$ | $Li_{0.4}VOPO_4$ | 3 | 236 | 93 | 3.71 | A |
| Example 10 | $Li_{1.2}Ni_{0.17}Co_{0.08}Mn_{0.55}O_2$ | $Li_{0.4}VOPO_4$ | 5 | 235 | 95 | 3.72 | A |
| Example 11 | $Li_{1.2}Ni_{0.17}Co_{0.08}Mn_{0.55}O_2$ | $Li_{0.4}VOPO_4$ | 10 | 232 | 94 | 3.73 | A |
| Example 12 | $Li_{1.2}Ni_{0.17}Co_{0.08}Mn_{0.55}O_2$ | $Li_{0.4}VOPO_4$ | 18 | 225 | 92 | 3.74 | A |
| Comparative Example 4 | $Li_{1.2}Ni_{0.17}Co_{0.08}Mn_{0.55}O_2$ | $Li_{0.4}VOPO_4$ | 20 | 215 | 88 | 3.74 | F |

In Table 2, the battery with a capacity of 220 mAh/g or more and an initial charge-discharge efficiency of 80% or more is evaluated as "A" and the battery with a capacity of less than 220 mAh/g or an initial charge-discharge efficiency of less than 80% is evaluated as "F".

Examples 13 to 17 and Comparative Example 5

In Examples 13 to 17 and Comparative Example 5, a positive electrode was manufactured using as a positive electrode active material, a material obtained by weighing and mixing in a mortar a lithium nickel composite oxide ($Li_{1.2}Ni_{0.7}Co_{0.08}Mn_{0.55}O_2$) as the first active material represented by the composition formula (2) and the compound with the composition according to Table 3 as the second active material at a molar ratio of 97:3. The compound with the composition according to Table 3 was obtained by deintercalating lithium from the orthorhombic crystal $LiVOPO_4$.

[Measurement of Electrical Characteristics]

The manufacture of the battery cell and the measurement of the electrical characteristics were performed in a manner similar to Example 7. The results are shown in Table 3.

TABLE 3

| | First active material | Second active material | ratio δ [mol %] | discharge capacity | initial charge-discharge efficiency [%] | average discharge voltage | determination |
|---|---|---|---|---|---|---|---|
| Example 13 | $Li_{1.2}Ni_{0.17}Co_{0.08}Mn_{0.55}O_2$ | $VOPO_4$ | 3 | 235 | 95 | 3.72 | A |
| Example 14 | $Li_{1.2}Ni_{0.17}Co_{0.08}Mn_{0.55}O_2$ | $Li_{0.1}VOPO_4$ | 3 | 235 | 94 | 3.72 | A |
| Example 15 | $Li_{1.2}Ni_{0.17}Co_{0.08}Mn_{0.55}O_2$ | $Li_{0.5}VOPO_4$ | 3 | 233 | 92 | 3.72 | A |
| Example 16 | $Li_{1.2}Ni_{0.17}Co_{0.08}Mn_{0.55}O_2$ | $Li_{0.8}VOPO_4$ | 3 | 234 | 89 | 3.72 | A |
| Example 17 | $Li_{1.2}Ni_{0.17}Co_{0.08}Mn_{0.55}O_2$ | $Li_{0.9}VOPO_4$ | 3 | 234 | 84 | 3.73 | A |
| Comparative Example 5 | $Li_{1.2}Ni_{0.17}Co_{0.08}Mn_{0.55}O_2$ | $Li\ VOPO_4$ | 3 | 234 | 76 | 3.73 | F |

In Table 3, the battery with a capacity of 220 mAh/g or more and an initial charge-discharge efficiency of 80% or more is evaluated as "A" and the battery with an initial charge-discharge efficiency of less than 80% is evaluated as "F".

Comparative Examples 6 and 7

In Comparative Examples 6 and 7, a positive electrode was manufactured using as a positive electrode active material, a material obtained by weighing and mixing in a mortar a lithium nickel composite oxide ($Li_{1.2}Ni_{0.17}Co_{0.08}Mn_{0.55}O_2$) as the first active material represented by the composition formula (2) and the compound with the composition according to Table 4 as the second active material at a molar ratio of 97:3. The compound with the composition according to Table 4 was obtained by deintercalating lithium from $LiFePO_4$.

[Measurement of Electrical Characteristics]
The manufacture of the battery cell and the measurement of the electrical characteristics were performed in a manner similar to Example 7. The results are shown in Table 4.

TABLE 4

| | First active material | Second active material | ratio δ [mol %] | discharge capacity | initial charge-discharge efficiency [%] | average discharge voltage | determination |
|---|---|---|---|---|---|---|---|
| Comparative Example 6 | $Li_{1.2}Ni_{0.17}Co_{0.08}Mn_{0.55}O_2$ | $Li_{0.4}FePO_4$ | 3 | 231 | 88 | 3.55 | F |
| Comparative Example 7 | $Li_{1.2}Ni_{0.17}Co_{0.08}Mn_{0.55}O_2$ | $Li_{0.1}FePO_4$ | 3 | 233 | 90 | 3.52 | F |

In Table 4, the battery with an average discharge voltage of less than 3.6 V is evaluated as "F".

Examples 18 to 22 and Comparative Example 8

In Examples 18 to 22 and Comparative Example 8, a positive electrode was manufactured using as a positive electrode active material, a material obtained by weighing and mixing in a mortar a lithium nickel composite oxide ($Li_{1.01}Ni_{0.8}Co_{0.15}Al_{0.05}O_2$) as the first active material represented by the composition formula (1) and the compound with the composition according to Table 5 as the second active material at a molar ratio of 97:3. The compound with the composition according to Table 5 was obtained by deintercalating lithium from the orthorhombic crystal $LiVOPO_4$.

[Measurement of Electrical Characteristics]

The manufacture of the battery cell and the measurement of the electrical characteristics were performed in a manner similar to Example 1. The results are shown in Table 5.

TABLE 5

| | First active material | Second active material | ratio δ [mol %] | discharge capacity | initial charge-discharge efficiency [%] | average discharge voltage | determination |
|---|---|---|---|---|---|---|---|
| Example 18 | $Li_{1.01}Ni_{0.8}Co_{0.15}Al_{0.05}O_2$ | $VOPO_4$ | 3 | 186 | 99 | 3.76 | A |
| Example 19 | $Li_{1.01}Ni_{0.8}Co_{0.15}Al_{0.05}O_2$ | $Li_{0.1}VOPO_4$ | 3 | 186 | 98 | 3.76 | A |
| Example 20 | $Li_{1.01}Ni_{0.8}Co_{0.15}Al_{0.05}O_2$ | $Li_{0.5}VOPO_4$ | 3 | 186 | 95 | 3.76 | A |
| Example 21 | $Li_{1.01}Ni_{0.8}Co_{0.15}Al_{0.05}O_2$ | $Li_{0.8}VOPO_4$ | 3 | 187 | 94 | 3.77 | A |
| Example 22 | $Li_{1.01}Ni_{0.8}Co_{0.15}Al_{0.05}O_2$ | $Li_{0.9}VOPO_4$ | 3 | 187 | 91 | 3.77 | A |
| Comparative Example 8 | $Li_{1.01}Ni_{0.8}Co_{0.15}Al_{0.05}O_2$ | $Li\ VOPO_4$ | 3 | 187 | 86 | 3.77 | F |

In Table 5, the battery with a capacity of 180 mAh/g or more, an initial charge-discharge efficiency of 90% or more, and an average discharge voltage of 3.6 V or more is evaluated as "A" and the battery with an initial charge-discharge efficiency of less than 90% is evaluated as "F".

Examples 23 to 25

In Examples 23 to 25, a positive electrode was manufactured using as a positive electrode active material, a material obtained by weighing and mixing in a mortar a lithium nickel composite oxide with the composition according to Table 6 as the first active material represented by the composition formula (1) and $Li_{0.4}VOPO_4$ as the second active material at a molar ratio of 99:1. $Li_{0.4}VOPO_4$ was obtained by deintercalating lithium from the orthorhombic crystal $LiVOPO_4$.

[Measurement of Electrical Characteristics]

The manufacture of the battery cell and the measurement of the electrical characteristics were performed in a manner similar to Example 1. The results are shown in Table 6.

TABLE 6

| | First active material | Second active material | ratio δ [mol %] | discharge capacity | initial charge-discharge efficiency [%] | average discharge voltage | determination |
|---|---|---|---|---|---|---|---|
| Example 23 | $Li_{1.01}Ni_{0.8}Co_{0.15}Al_{0.04}Fe_{0.01}O_2$ | $Li_{0.4}VOPO_4$ | 1 | 186 | 94 | 3.75 | A |
| Example 24 | $Li_{1.01}Ni_{0.8}Co_{0.15}Al_{0.04}Cr_{0.01}O_2$ | $Li_{0.4}VOPO_4$ | 1 | 186 | 93 | 3.75 | A |
| Example 25 | $Li_{1.01}Ni_{0.78}Co_{0.15}Al_{0.05}Mg_{0.01}O_2$ | $Li_{0.4}VOPO_4$ | 1 | 186 | 94 | 3.75 | A |

In Table 6, the battery with a capacity of 180 mAh/g or more, an initial charge-discharge efficiency of 90% or more, and an average discharge voltage of 3.6 V or more is evaluated as "A".

Examples 26 to 32

In Examples 26 to 32, a positive electrode was manufactured using as a positive electrode active material, a material obtained by weighing and mixing in a mortar a lithium nickel composite oxide with the composition according to Table 7 as the first active material represented by the composition formula (1) and $Li_{0.4}VOPO_4$ as the second active material at a molar ratio of 99:1. $Li_{0.4}VOPO_4$ was obtained by deintercalating lithium from the orthorhombic crystal $LiVOPO_4$.

[Measurement of Electrical Characteristics]

The manufacture of the battery cell and the measurement of the electrical characteristics were performed in a manner similar to Example 7. The results are shown in Table 7.

In Table 7, the battery with a capacity of 220 mAh/g or more, an initial charge-discharge efficiency of 80% or more, and an average discharge voltage of 3.6 V or more is evaluated as "A".

Comparative Examples 9 to 12

In Comparative Examples 9 to 12, a positive electrode was manufactured using as a positive electrode active material, a material obtained by weighing and mixing in a mortar a lithium nickel composite oxide ($Li_{1.01}Ni_{0.8}Co_{0.15}Al_{0.05}O_2$) as the first active material represented by the composition formula (2) and the compound with the composition according to Table 8 as the second active material at a molar ratio of 97:3. The compound with the composition according to Table 8 was obtained by deintercalating lithium from $LiFePO_4$.

[Measurement of Electrical Characteristics]

The manufacture of the battery cell and the measurement of the electrical characteristics were performed in a manner similar to Example 1. The results are shown in Table 8.

TABLE 7

| | First active material | Second active material | ratio δ [mol %] | discharge capacity | initial charge-discharge efficiency [%] | average discharge voltage | determination |
|---|---|---|---|---|---|---|---|
| Example 26 | $Li_{1.2}Ni_{0.17}Co_{0.07}Mn_{0.55}Al_{0.01}O_2$ | $Li_{0.4}VOPO_4$ | 1 | 237 | 88 | 3.71 | A |
| Example 27 | $Li_{1.2}Ni_{0.17}Co_{0.08}Mn_{0.54}Si_{0.01}O_2$ | $Li_{0.4}VOPO_4$ | 1 | 237 | 87 | 3.70 | A |
| Example 28 | $Li_{1.2}Ni_{0.17}Co_{0.08}Mn_{0.54}Zr_{0.01}O_2$ | $Li_{0.4}VOPO_4$ | 1 | 237 | 87 | 3.71 | A |
| Example 29 | $Li_{1.2}Ni_{0.17}Co_{0.08}Mn_{0.84}Ti_{0.01}O_2$ | $Li_{0.4}VOPO_4$ | 1 | 238 | 87 | 3.71 | A |
| Example 30 | $Li_{1.2}Ni_{0.17}Co_{0.07}Mn_{0.85}Fe_{0.01}O_2$ | $Li_{0.4}VOPO_4$ | 1 | 237 | 88 | 3.70 | A |
| Example 31 | $Li_{1.2}Ni_{0.17}Co_{0.07}Mn_{0.85}Cr_{0.01}O_2$ | $Li_{0.4}VOPO_4$ | 1 | 237 | 88 | 3.71 | A |
| Example 32 | $Li_{1.2}Ni_{0.16}Co_{0.08}Mn_{0.55}Mg_{0.01}O_2$ | $Li_{0.4}VOPO_4$ | 1 | 237 | 87 | 3.70 | A |

TABLE 8

| | First active material | Second active material | ratio δ [mol %] | discharge capacity | initial charge-discharge efficiency [%] | average discharge voltage | determination |
|---|---|---|---|---|---|---|---|
| Comparative Example 9 | $Li_{1.01}Ni_{0.8}Co_{0.10}Al_{0.05}O_2$ | $FePO_4$ | 3 | 186 | 93 | 3.54 | F |
| Comparative Example 10 | $Li_{1.01}Ni_{0.8}Co_{0.18}Al_{0.08}O_2$ | $Li_{0.1}FePO_4$ | 3 | 186 | 91 | 3.53 | F |
| Comparative Example 11 | $Li_{1.01}Ni_{0.8}Co_{0.18}Al_{0.05}O_2$ | $Li_{0.4}FePO_4$ | 3 | 186 | 89 | 3.54 | F |
| Comparative Example 12 | $Li_{1.01}Ni_{0.8}Co_{0.15}Al_{0.05}O_2$ | $Li_{0.8}FePO_4$ | 3 | 187 | 87 | 3.53 | F |

In Table 8, the battery with an average discharge voltage of less than 3.6 V is evaluated as "F".

Comparative Examples 13 and 14

In Comparative Examples 13 and 14, a positive electrode was manufactured using as a positive electrode active material, a material obtained by weighing and mixing in a mortar a lithium nickel composite oxide ($Li_{1.2}Ni_{0.17}Co_{0.08}Mn_{0.55}O_2$) as the first active material represented by the composition formula (2) and the compound with the composition according to Table 9 as the second active material at a molar ratio of 97:3. The compound with the composition according to Table 9 was obtained by deintercalating lithium from $LiFePO_4$.

[Measurement of Electrical Characteristics]

The manufacture of the battery cell and the measurement of the electrical characteristics were performed in a manner similar to Example 7. The results are shown in Table 9.

active material, a material obtained by weighing and mixing in a mortar a lithium nickel composite oxide with the composition and the weight ratio according to Table 10 as the first active material represented by the composition formulae (1) and (2), and $Li_{0.4}VOPO_4$ or $Li_{0.4}FePO_4$ as the second active material at a molar ratio of 97:3. $Li_{0.4}VOPO_4$ was obtained by deintercalating lithium from the orthorhombic crystal $LiVOPO_4$. $Li_{0.4}FePO_4$ was obtained by deintercalating lithium from $LiFePO_4$.

[Measurement of Electrical Characteristics]

The manufacture of the battery cell and the measurement of the electrical characteristics were performed in a manner similar to Example 1. The results are shown in Table 10.

TABLE 9

| | First active material | Second active material | ratio δ [mol %] | discharge capacity | initial charge-discharge efficiency [%] | average discharge voltage | determination |
|---|---|---|---|---|---|---|---|
| Comparative Example 13 | $Li_{1.2}Ni_{0.17}Co_{0.08}Mn_{0.55}O_2$ | $FePO_4$ | 3 | 231 | 89 | 3.52 | F |
| Comparative Example 14 | $Li_{1.2}Ni_{0.17}Co_{0.08}Mn_{0.55}O_2$ | $Li_{0.8}FePO_4$ | 3 | 233 | 81 | 3.51 | F |

In Table 9, the battery with an average discharge voltage of less than 3.6 V is evaluated as "F".

Example 33 and Comparative Example 15

In Example 33 and Comparative Example 15, a positive electrode was manufactured using as a positive electrode

TABLE 10

| | First active material | Second active material | ratio δ [mol %] | discharge capacity | initial charge-discharge efficiency [%] | average discharge voltage | determination |
|---|---|---|---|---|---|---|---|
| Example 33 | weight ratio: 90:10 $Li_{1.01}Ni_{0.8}Co_{0.15}Al_{0.05}O_2$ $Li_{1.2}Ni_{0.17}Co_{0.08}Mn_{0.55}O_2$ | $Li_{0.4}VOPO_4$ | 3 | 185 | 95 | 3.74 | A |
| Comparative Example 15 | weight ratio: 90:10 $Li_{1.01}Ni_{0.8}Co_{0.15}Al_{0.05}O_2$ $Li_{1.2}Ni_{0.17}Co_{0.08}Mn_{0.55}O_2$ | $Li_{0.4}FeO_4$ | 3 | 184 | 93 | 3.53 | F |

In Table 10, the battery with a capacity of 180 mAh/g or more, an initial charge-discharge efficiency of 90% or more, and an average discharge voltage of 3.6 V or more is evaluated as "A" and the battery with an average discharge voltage of less than 3.6 V is evaluated as "F".

Example 34 and Comparative Example 16

In Example 34 and Comparative Example 16, a positive electrode was manufactured using as a positive electrode active material, a material obtained by weighing and mixing in a mortar a lithium nickel composite oxide with the composition and the weight ratio according to Table 11 as the first active material represented by the composition formulae (1) and (2), and $Li_{0.4}VOPO_4$ or $Li_{0.4}FePO_4$ as the second active material at a molar ratio of 97:3. $Li_{0.4}VOPO_4$ was obtained by deintercalating lithium from the orthorhombic crystal $LiVOPO_4$. $Li_{0.4}FePO_4$ was obtained by deintercalating lithium from $LiFePO_4$.

[Measurement of Electrical Characteristics]

The manufacture of the battery cell and the measurement of the electrical characteristics were performed in a manner similar to Example 7. The results are shown in Table 11.

TABLE 11

|  | First active material | Second active material | ratio δ [mol %] | discharge capacity | initial charge-discharge efficiency [%] | average discharge voltage | determination |
|---|---|---|---|---|---|---|---|
| Example 34 | weight ratio: 10:90 $Li_{1.01}Ni_{0.8}Co_{0.15}Al_{0.05}O_2$ $Li_{1.2}Ni_{0.17}Co_{0.08}Mn_{0.55}O_2$ | $Li_{0.4}VOPO_4$ | 3 | 232 | 88.3 | 3.72 | A |
| Comparative Example 16 | weight ratio: 10:90 $Li_{1.01}Ni_{0.8}Co_{0.15}Al_{0.05}O_2$ $Li_{1.2}Ni_{0.17}Co_{0.08}Mn_{0.55}O_2$ | $Li_{0.4}FeO_4$ | 3 | 231 | 85.3 | 3.51 | F |

In Table 11, the battery with a capacity of 220 mAh/g or more, an initial charge-discharge efficiency of 80% or more, and an average discharge voltage of 3.6 V or more is evaluated as "A" and the battery with an average discharge voltage of less than 3.6 V is evaluated as "F".

Examples 35 to 38 and Comparative Examples 17 to 19

In Examples 35 to 38 and Comparative Examples 17 to 19, a positive electrode was manufactured using as a positive electrode active material, a material obtained by weighing and mixing in a mortar a lithium nickel composite oxide with the composition according to Table 12 as the first active material represented by the composition formula (1), and $Li_{0.4}VOPO_4$ as the second active material at a molar ratio of 97:3. $Li_{0.4}VOPO_4$ was obtained by deintercalating lithium from the orthorhombic crystal $LiVOPO_4$.

[Measurement of Electrical Characteristics]

The manufacture of the battery cell and the measurement of the electrical characteristics were performed in a manner similar to Example 1. The results are shown in Table 12.

TABLE 12

|  | First active material | Second active material | ratio δ [mol %] | discharge capacity | initial charge-discharge efficiency [%] | average discharge voltage | determination |
|---|---|---|---|---|---|---|---|
| Example 35 | $Li_{1.08}Ni_{0.8}Co_{0.15}Al_{0.05}O_2$ | $Li_{0.4}VOPO_4$ | 3 | 182 | 95 | 3.73 | A |
| Example 36 | $Li_{1.05}Ni_{0.8}Co_{0.15}Al_{0.05}O_2$ | $Li_{0.4}VOPO_4$ | 3 | 184 | 95 | 3.75 | A |
| Example 37 | $Li_{1.08}Ni_{0.85}Co_{0.2}Al_{0.18}O_2$ | $Li_{0.4}VOPO_4$ | 3 | 182 | 94 | 3.74 | A |
| Example 38 | $Li_{1.01}Ni_{0.7}Co_{0.2}Mn_{0.05}Al_{0.05}O_2$ | $Li_{0.4}VOPO_4$ | 3 | 181 | 94 | 3.73 | A |
| Comparative Example 17 | $Li_{1.12}Ni_{0.8}Co_{0.15}Al_{0.05}O_2$ | $Li_{0.4}VOPO_4$ | 3 | 172 | 92 | 3.72 | F |
| Comparative Example 18 | $Li_{1.01}Ni_{0.53}Co_{0.25}Mn_{0.17}Al_{0.05}O_2$ | $Li_{0.4}VOPO_4$ | 3 | 172 | 92 | 3.72 | F |
| Comparative Example 19 | $Li_{0.98}Ni_{0.8}Co_{0.15}Al_{0.05}O_2$ | $Li_{0.4}VOPO_4$ | 3 | 173 | 93 | 3.73 | F |

In Table 12, the battery with a capacity of 180 mAh/g or more, an initial charge-discharge efficiency of 90% or more, and an average discharge voltage of 3.6 V or more is evaluated as "A" and the battery with a capacity of less than 180 mAh/g is evaluated as "F".

Examples 39 to 42 and Comparative Examples 20 to 22

In Examples 39 to 42 and Comparative Examples 20 to 22, a positive electrode was manufactured using as a positive electrode active material, a material obtained by weighing and mixing in a mortar a lithium nickel composite oxide with the composition according to Table 13 as the first active material represented by the composition formula (1), and $Li_{0.4}VOPO_4$ as the second active material at a molar ratio of 95:5. $Li_{0.4}VOPO_4$ was obtained by deintercalating lithium from the orthorhombic crystal $LiVOPO_4$.

[Measurement of Electrical Characteristics]

The manufacture of the battery cell and the measurement of the electrical characteristics were performed in a manner similar to Example 1. The results are shown in Table 13.

Examples 43 to 49 and Comparative Examples 23 to 29

In Examples 43 to 49 and Comparative Examples 23 to 29, a positive electrode was manufactured using as a positive electrode active material, a material obtained by weighing and mixing in a mortar a lithium nickel composite oxide with the composition according to Table 14 as the first active material represented by the composition formula (2), and $Li_{0.4}VOPO_4$ as the second active material at a molar ratio of 97:3. $Li_{0.4}VOPO_4$ was obtained by deintercalating lithium from the orthorhombic crystal $LiVOPO_4$.

[Measurement of Electrical Characteristics]

The manufacture of the battery cell and the measurement of the electrical characteristics were performed in a manner similar to Example 7. The results are shown in Table 14.

TABLE 13

| | First active material | Second active material | ratio δ [mol %] | discharge capacity | initial charge-discharge efficiency [%] | average discharge voltage | determination |
|---|---|---|---|---|---|---|---|
| Example 39 | $Li_{1.08}Ni_{0.8}Co_{0.15}Al_{0.05}O_2$ | $Li_{0.4}VOPO_4$ | 5 | 181 | 96 | 3.73 | A |
| Example 40 | $Li_{1.08}Ni_{0.8}Co_{0.15}Al_{0.05}O_2$ | $Li_{0.4}VOPO_4$ | 5 | 183 | 96 | 3.75 | A |
| Example 41 | $Li_{1.08}Ni_{0.85}Co_{0.2}Al_{0.15}O_2$ | $Li_{0.4}VOPO_4$ | 5 | 181 | 94 | 3.74 | A |
| Example 42 | $Li_{1.01}Ni_{0.7}Co_{0.2}Mn_{0.05}Al_{0.05}O_2$ | $Li_{0.4}VOPO_4$ | 5 | 181 | 94 | 3.74 | A |
| Comparative Example 20 | $Li_{1.12}Ni_{0.8}Co_{0.15}Al_{0.05}O_2$ | $Li_{0.4}VOPO_4$ | 5 | 171 | 94 | 3.72 | F |
| Comparative Example 21 | $Li_{1.01}Ni_{0.53}Co_{0.25}Mn_{0.17}Al_{0.05}O_2$ | $Li_{0.4}VOPO_4$ | 5 | 170 | 93 | 3.72 | F |
| Comparative Example 22 | $Li_{0.98}Ni_{0.8}Co_{0.15}Al_{0.05}O_2$ | $Li_{0.4}VOPO_4$ | 5 | 170 | 94 | 3.73 | F |

In Table 13, the battery with a capacity of 180 mAh/g or more, an initial charge-discharge efficiency of 90% or more,

TABLE 14

| | First active material | Second active material | ratio δ [mol %] | discharge capacity | initial charge-discharge efficiency [%] | average discharge voltage | determination |
|---|---|---|---|---|---|---|---|
| Example 43 | $Li_{1.2}Ni_{0.2}Mn_{0.8}O_2$ | $Li_{0.4}VOPO_4$ | 3 | 234 | 91 | 3.71 | A |
| Example 44 | $Li_{1.2}Ni_{0.13}Co_{0.14}Mn_{0.63}O_2$ | $Li_{0.4}VOPO_4$ | 3 | 232 | 90 | 3.69 | A |
| Example 45 | $Li_{1.2}Ni_{0.08}Co_{0.24}Mn_{0.48}O_2$ | $Li_{0.4}VOPO_4$ | 3 | 230 | 89 | 3.68 | A |
| Example 46 | $Li_{1.28}Ni_{0.04}Co_{0.08}Mn_{0.60}O_2$ | $Li_{0.4}VOPO_4$ | 3 | 231 | 87 | 3.67 | A |
| Example 47 | $Li_{1.04}Ni_{0.3}Co_{0.28}Mn_{0.33}O_2$ | $Li_{0.4}VOPO_4$ | 3 | 225 | 89 | 3.72 | A |
| Example 48 | $Li_{1.28}Ni_{0.08}Mn_{0.64}O_2$ | $Li_{0.4}VOPO_4$ | 3 | 233 | 92 | 3.71 | A |
| Example 49 | $Li_{1.05}Ni_{0.3}Co_{0.3}Mn_{0.35}O_2$ | $Li_{0.4}VOPO_4$ | 3 | 224 | 91 | 3.72 | A |
| Comparative Example 23 | $Li_{0.98}Ni_{0.26}Co_{0.23}Mn_{0.50}O_2$ | $Li_{0.4}VOPO_4$ | 3 | 187 | 85 | 3.62 | F |
| Comparative Example 24 | $Li_{1.32}Ni_{0.08}Co_{0.02}Mn_{0.60}O_2$ | $Li_{0.4}VOPO_4$ | 3 | 202 | 85 | 3.66 | F |
| Comparative Example 25 | $Li_{1.25}Co_{0.24}Mn_{0.51}O_2$ | $Li_{0.4}VOPO_4$ | 3 | 204 | 84 | 3.07 | F |
| Comparative Example 26 | $Li_{1.2}Ni_{0.32}Co_{0.08}Mn_{0.48}O_2$ | $Li_{0.4}VOPO_4$ | 3 | 213 | 87 | 3.65 | F |
| Comparative Example 27 | $Li_{1.2}Ni_{0.04}Co_{0.32}Mn_{0.44}O_2$ | $Li_{0.4}VOPO_4$ | 3 | 208 | 84 | 3.66 | F |
| Comparative Example 28 | $Li_{1.2}Ni_{0.28}Co_{0.24}Mn_{0.29}O_2$ | $Li_{0.4}VOPO_4$ | 3 | 185 | 84 | 3.63 | F |
| Comparative Example 29 | $Li_{1.28}Ni_{0.02}Co_{0.01}Mn_{0.71}O_2$ | $Li_{0.4}VOPO_4$ | 3 | 195 | 86 | 3.65 | F |

In Table 14, the battery with a capacity of 220 mAh/g or more, an initial charge-discharge efficiency of 80% or more, and an average discharge voltage of 3.6 V or more is evaluated as "A" and the battery with a capacity of less than 220 mAh/g is evaluated as "F".

Examples 50 to 56 and Comparative Examples 30 to 36

In Examples 50 to 56 and Comparative Examples 30 to 36, a positive electrode was manufactured using as a positive electrode active material, a material obtained by weighing and mixing in a mortar a lithium nickel composite oxide with the composition according to Table 15 as the first active material represented by the composition formula (2), and $Li_{0.4}VOPO_4$ as the second active material at a molar ratio of 95:5. $Li_{0.4}VOPO_4$ was obtained by deintercalating lithium from the orthorhombic crystal $LiVOPO_4$.

[Measurement of Electrical Characteristics]

The manufacture of the battery cell and the measurement of the electrical characteristics were performed in a manner similar to Example 7. The results are shown in Table 15.

TABLE 15

| | First active material | Second active material | ratio δ [mol %] | discharge capacity | initial charge-discharge efficiency [%] | average discharge voltage | determination |
|---|---|---|---|---|---|---|---|
| Example 50 | $Li_{1.2}Ni_{0.2}Mn_{0.6}O_2$ | $Li_{0.4}VOPO_4$ | 5 | 234 | 92 | 3.71 | A |
| Example 51 | $Li_{1.2}Ni_{0.13}Co_{0.14}Mn_{0.53}O_2$ | $Li_{0.4}VOPO_4$ | 5 | 232 | 91 | 3.69 | A |
| Example 52 | $Li_{1.2}Ni_{0.08}Co_{0.24}Mn_{0.48}O_2$ | $Li_{0.4}VOPO_4$ | 5 | 230 | 90 | 3.08 | A |
| Example 53 | $Li_{1.28}Ni_{0.04}Co_{0.08}Mn_{0.60}O_2$ | $Li_{0.4}VOPO_4$ | 5 | 231 | 88 | 3.67 | A |
| Example 54 | $Li_{1.04}Ni_{0.3}Co_{0.28}Mn_{0.38}O_2$ | $Li_{0.4}VOPO_4$ | 5 | 225 | 91 | 3.72 | A |
| Example 55 | $Li_{1.28}Ni_{0.08}Mn_{0.04}O_2$ | $Li_{0.4}VOPO_4$ | 5 | 232 | 93 | 3.71 | A |
| Example 56 | $Li_{1.98}Ni_{0.3}Co_{0.3}Mn_{0.38}O_2$ | $Li_{0.4}VOPO_4$ | 5 | 223 | 93 | 3.72 | A |
| Comparative Example 30 | $Li_{0.98}Ni_{0.26}Co_{0.23}Mn_{0.50}O_2$ | $Li_{0.4}VOPO_4$ | 5 | 184 | 86 | 3.62 | F |
| Comparative Example 31 | $Li_{1.32}Ni_{0.08}Co_{0.02}Mn_{0.60}O_2$ | $Li_{0.4}VOPO_4$ | 5 | 200 | 86 | 3.66 | F |
| Comparative Example 32 | $Li_{1.25}Co_{0.24}Mn_{0.51}O_2$ | $Li_{0.4}VOPO_4$ | 5 | 201 | 85 | 3.67 | F |
| Comparative Example 33 | $Li_{1.2}Ni_{0.32}Co_{0.08}Mn_{0.48}O_2$ | $Li_{0.4}VOPO_4$ | 5 | 211 | 88 | 3.65 | F |
| Comparative Example 34 | $Li_{1.2}Ni_{0.04}Co_{0.32}Mn_{0.44}O_2$ | $Li_{0.4}VOPO_4$ | 5 | 205 | 85 | 3.66 | F |
| Comparative Example 35 | $Li_{1.2}Ni_{0.28}Co_{0.24}Mn_{0.29}O_2$ | $Li_{0.4}VOPO_4$ | 5 | 183 | 85 | 3.63 | F |
| Comparative Example 36 | $Li_{1.28}Ni_{0.02}Co_{0.01}Mn_{0.71}O_2$ | $Li_{0.4}VOPO_4$ | 5 | 193 | 86 | 3.65 | F |

In Table 15, the battery with a capacity of 220 mAh/g or more, an initial charge-discharge efficiency of 80% or more, and an average discharge voltage of 3.6 V or more is evaluated as "A" and the battery with a capacity of less than 220 mAh/g is evaluated as "F".

Comparative Examples 37 and 38

In Comparative Examples 37 and 38, a positive electrode was manufactured using as a positive electrode active material, a material obtained by weighing and mixing in a mortar a lithium nickel composite oxide ($Li_{1.01}Ni_{0.8}Co_{0.15}Al_{0.05}O_2$) as the first active material represented by the composition formula (2) and $V_2O_5$ as the second active material at a molar ratio of 97:3 and 95:5.

[Measurement of Electrical Characteristics]

The manufacture of the battery cell and the measurement of the electrical characteristics were performed in a manner similar to Example 1. The results are shown in Table 16.

TABLE 16

| | First active material | Second active material | ratio δ [mol %] | discharge capacity | initial charge-discharge efficiency [%] | average discharge voltage | determination |
|---|---|---|---|---|---|---|---|
| Comparative Example 37 | $Li_{1.01}Ni_{0.8}Co_{0.15}Al_{0.05}O_2$ | $V_2O_5$ | 3 | 186 | 90 | 3.51 | F |
| Comparative Example 38 | $Li_{1.01}Ni_{0.8}Co_{0.15}Al_{0.05}O_2$ | $V_2O_5$ | 5 | 186 | 91 | 3.50 | F |

In Table 16, the battery with an average discharge voltage of less than 3.6 V is evaluated as "F".

Comparative Examples 39 and 40

In Comparative Examples 39 and 40, a positive electrode was manufactured using as a positive electrode active material, a material obtained by weighing and mixing in a mortar a lithium nickel composite oxide ($Li_{1.2}Ni_{0.17}Co_{0.08}Mn_{0.55}O_2$) as the first active material represented by the composition formula (2) and $V_2O_5$ as the second active material at a molar ratio of 97:3 and 95:5.

[Measurement of Electrical Characteristics]

The manufacture of the battery cell and the measurement of the electrical characteristics were performed in a manner similar to Example 7. The results are shown in Table 17.

TABLE 17

| | First active material | Second active material | ratio δ [mol %] | discharge capacity | initial charge-discharge efficiency [%] | average discharge voltage | determination |
|---|---|---|---|---|---|---|---|
| Comparative Example 39 | $Li_{1.2}Ni_{0.17}Co_{0.08}Mn_{0.55}O_2$ | $V_2O_5$ | 3 | 232 | 88 | 3.49 | F |
| Comparative Example 40 | $Li_{1.2}Ni_{0.17}Co_{0.08}Mn_{0.55}O_2$ | $V_2O_5$ | 5 | 230 | 89 | 3.48 | F |

In Table 17, the battery with an average discharge voltage of less than 3.6 V is evaluated as "F".

As is clear from the results obtained in the evaluation, it has been confirmed that the battery obtained in the examples has high capacity, high initial charge-discharge efficiency and high average discharge voltage as compared with the battery obtained in the comparative examples.

DESCRIPTION OF REFERENCE NUMERALS

10 positive electrode
20 negative electrode
12 positive electrode current collector
14 positive electrode active material layer
18 separator
22 negative electrode current collector
24 negative electrode active material layer
30 multilayer body
50 case
60, 62 lead
100 lithium ion secondary battery

What is claimed is:

1. An active material comprising:
   at least one kind of first active material selected from active materials represented by a composition formula (1) or a composition formula (2)

   $$Li_wNi_x(M1)_y(M2)_zO_2 \quad (1)$$

[where M1 represents at least one kind selected from Co and Mn; M2 represents at least one kind selected from Al, Fe, Cr, and Mg; 1.0<w<1.1; 2.0<(x+y+z+w)≤2.1; 0.3<x<0.95; 0.01<y<0.4; and 0.001<z<0.2]

   $$Li_tNi_pCo_qMn_r(M3)_sO_2 \quad (2)$$

[where M3 represents at least one kind select cc from the group consisting of Al, Si, Zr, Ti, Fe, Mg, Nb, Ba, and V; 2.0≤(p+q+r+s+t)≤2.2, 1.0<t≤1.3, 0<p≤0.3, 0≤q≤0.3, 0.3≤r≤0.7, and 0≤s≤0.1]; and
   a second active material represented by a composition formula (3), which is different from the first active material

   $$Li_{1-\alpha}VOPO_4 \quad (3)$$

[where α satisfies 0<α≤1],
   wherein a ratio (δ) of the second active material (B) to the total amount by mole of the first active material (A) and the second active material (B) satisfies 0.4 mol %≤δ≤18 mol % [where δ=(B/(A+B))×100].

2. An electrode comprising:
   a current collector; and
   an active material layer containing the active material according to claim 1 and provided on the current collector.

3. A lithium ion secondary battery comprising:
   the electrode according to claim 2;
   a negative electrode provided opposite to the electrode;
   a separator provided between the electrodes; and
   an electrolyte.

4. The active material according to claim 1, wherein α satisfies 0.2≤α≤1.

5. The active material according to claim 1, wherein the second active material has an orthorhombic crystal state.

6. The active material according to claim 1, wherein primary particles of the first active material and the second active material have an average particle diameter of 0.05 μm or more and 10 μm or less, and the average particle diameter of the primary particles of the second active material is smaller than that of the first active material.

7. An electrode comprising:
   a current collector; and
   an active material layer containing the active material according to claim 4 and provided on the current collector.

8. A lithium ion secondary battery comprising:
   the electrode according to claim 7;
   a negative electrode provided opposite to the electrode;
   a separator provided between the electrodes; and
   an electrolyte.

9. An electrode comprising:
   a current collector; and
   an active material layer containing the active material according to claim 5 and provided on the current collector.

10. A lithium ion secondary battery comprising:
    the electrode according to claim 9;
    a negative electrode provided opposite to the electrode;
    a separator provided between the electrodes; and
    an electrolyte.

11. An electrode comprising:
    a current collector; and
    an active material layer containing the active material according to claim 6 and provided on the current collector.

12. A lithium ion secondary battery comprising:
    the electrode according to claim 11;
    a negative electrode provided opposite to the electrode;
    a separator provided between the electrodes; and
    an electrolyte.

13. The active material according to claim 1, wherein the first active material includes the active material represented by the composition formula (1).

14. The active material according to claim 13, wherein M2 is Al.

15. The active material according to claim 14, wherein M1 includes Co.

16. The active material according to claim 14, wherein M1 includes Mn.

17. The active material according to claim 1, wherein the first active material includes the active material represented by the composition formula (2).

18. The active material according to claim 17, wherein q and s are both 0.

19. The active material according to claim 17, wherein only s is 0.

* * * * *